United States Patent [19]

Shimano

[11] 4,348,916

[45] Sep. 14, 1982

[54] BRAKE OPERATING DEVICE FOR A BICYCLE

[75] Inventor: Keizo Shimano, Sakai, Japan

[73] Assignee: Shimano Industrial Company Limited, Osaka, Japan

[21] Appl. No.: 162,586

[22] Filed: Jun. 24, 1980

[30] Foreign Application Priority Data

Jul. 2, 1979 [JP] Japan .............................. 54-91975[U]
Jul. 23, 1979 [JP] Japan ............................ 54-102173[U]
Jul. 27, 1979 [JP] Japan ............................ 54-104394[U]

[51] Int. Cl.³ .................... G05G 7/00; F16C 3/28; B62L 3/02
[52] U.S. Cl. .................................. 74/489; 74/501 R; 74/522; 74/571 M
[58] Field of Search ..................... 74/488, 489, 501 R, 74/522, 571 M

[56] References Cited

U.S. PATENT DOCUMENTS 3,808,908 5/1974 Guerr ..................................... 74/489
4,084,449 4/1978 Kine ................................. 74/489 X

FOREIGN PATENT DOCUMENTS 443053 12/1948 Italy ....................................... 74/489
460340 11/1950 Italy ....................................... 74/489
266078 2/1927 United Kingdom .
404080 1/1934 United Kingdom .
901937 7/1962 United Kingdom .

*Primary Examiner*—Allan D. Herrmann
*Attorney, Agent, or Firm*—Stevens, Davis, Miller & Mosher

[57] ABSTRACT

A brake operating device for a bicycle, which comprises a bracket member fixed to a handle bar and a control lever pivoted to the bracket member through a lever shaft. The lever is pivoted to the bracket member at a pivot portion disposed on a straight line passing through the center of a distance between the brake applying position and the brake rest position of the grip portion of the lever.

5 Claims, 14 Drawing Figures

BRAKE OPERATING DEVICE FOR A BICYCLE

FIELD OF THE ART

This invention relates to a brake operating device for a bicycle, and more particularly to a brake operating device connected to brakes for a bicycle through a control wire so that the control wire is pulled to operate the brakes.

BACKGROUND OF THE INVENTION

Generally, this kind of brake operating device is mounted on a handle bar of a bicycle and comprises a bracket member fixed to the handle bar and a lever pivoted to the bracket member through a lever shaft and one end of a control wire is supported to one of the lever and bracket member and one end of an outer sheath guiding the control wire is supported to the other.

The lever is usually L-like shaped and comprises a pivot portion and a grip portion. The lever is pivoted at the pivot portion to the bracket member, and keeps a regular grip dimension between the grip portion and the handle bar. The control wire is supported at its one end to an intermediate bent section of the lever and the outer sheath guiding the control wire is supported at one end to the bracket member. A rider, when exerting the braking action, stretches the fingers of his hand gripping the handle bar and grips the lever to pull the control wire.

However, a conventional brake operating device, as shown in FIG. 12, pivotally supports the lever L to the bracket member A, at the pivot position P radially inward of the handle bar B with respect to the position where the wire W and outer sheath O are supported, in other words, the pivot position P is in proximity to the handle bar B. Hence, the grip portion of the lever, when exerting the braking action, swings around the pivot position P toward the handle bar B, whereby the utmost end of grip portion travels along a line of movement defining a large circular arc as shown by the dot-and-dash line in FIG. 12. Therefore, the grip portion of the lever gripped by the driver's hand, when effecting the braking action, moves lengthwise of the handle bar and is displaced with respect to the position of the driver's hand gripping the handle bar. As a result, it is hard to exert a stable braking action.

In addition, the above brake operating device has the problem in that the wire W and outer sheath O are supported radially away from the handle bar B, thereby making it hard to extend them along the handle bar B.

SUMMARY OF THE INVENTION

The present invention is designed to overcome the above problems. A main object of the invention is to provide a brake operating device which can, when effecting the braking action, reduce displacement of the lever grip portion lengthwise of the handle bar with respect to the position of the grip portion when not exerting the braking action.

Another object of the invention is to provide a brake operating device which can readily extend a control wire and an outer sheath along the handle bar to be supported to the lever and bracket member.

The inventor, after researching the above-mentioned problems, has discovered these problems are caused by the lever being pivoted at a point radially away from but close to the handle bar and by the grip portion of the lever being at about the same level as the pivot portion of the lever with respect to the handle bar. Therefore, to overcome these problems, a brake operating device in accordance with the invention has an operating lever pivoted to the bracket member at a position on a straight line passing through about the center of a distance between the brake applying position and the rest position of the grip portion of the lever so that the displacement of the grip portion lengthwise of the handle bar is reduced, thereby enabling a stable braking action.

BRIEF DESCRIPTION OF THE INVENTION

FIG. 1 is a partially longitudinally sectional side view of an embodiment of a brake operating device of the invention, FIG. 2 is a view explanatory of working condition thereof when exerting the braking action, FIG. 3 is a side view of the brake operating device in FIG. 1, in which a bracket member is partially cutaway, FIG. 4 is a partially longitudinally sectional front view of the brake operating device in FIG. 3, FIG. 5 is a perspective view of a part of a lever and an outer sheath stop, FIG. 6 is a partially cutaway front view of a modified embodiment of the invention, FIG. 7 is a partially cutaway front view of the brake operating device in FIG. 6, in condition of changing a grip dimension, FIG. 8 is a side view of the brake operating device in FIG. 6, FIG. 9 is an enlarged cross-sectional view of a lever shaft portion, FIG. 10 is a perspective enlarged view of the lever shaft and bushes, FIG. 11 is a perspective enlarged view of a part of the bracket member, and FIG. 12 is a partially cutaway side view of a conventional brake operating device.

FIGS. 13 and 14 are detail views of the bushes.

DETAILED DESCRIPTION OF THE INVENTION

Figure 1:
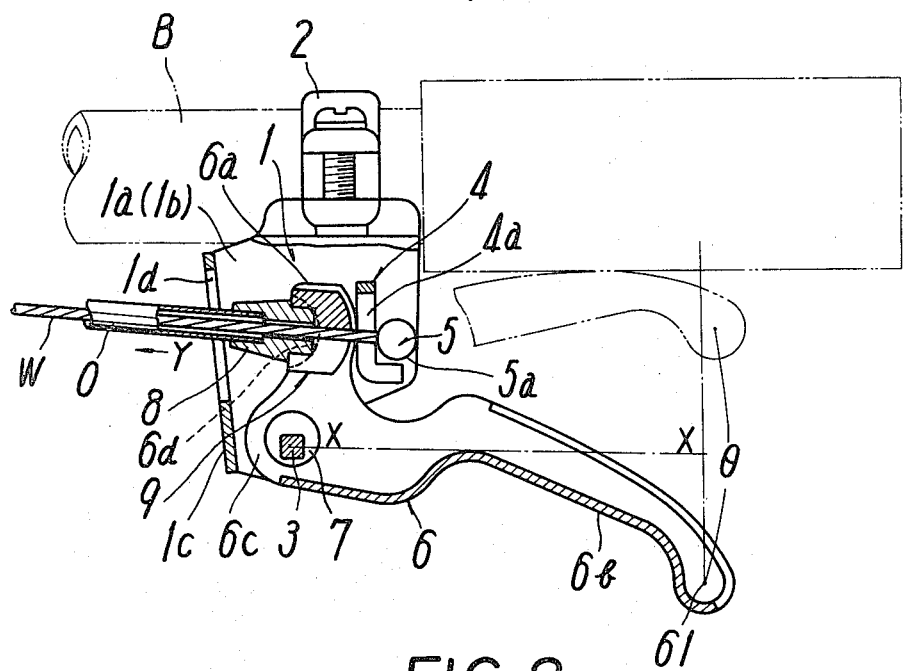
Figure 2:
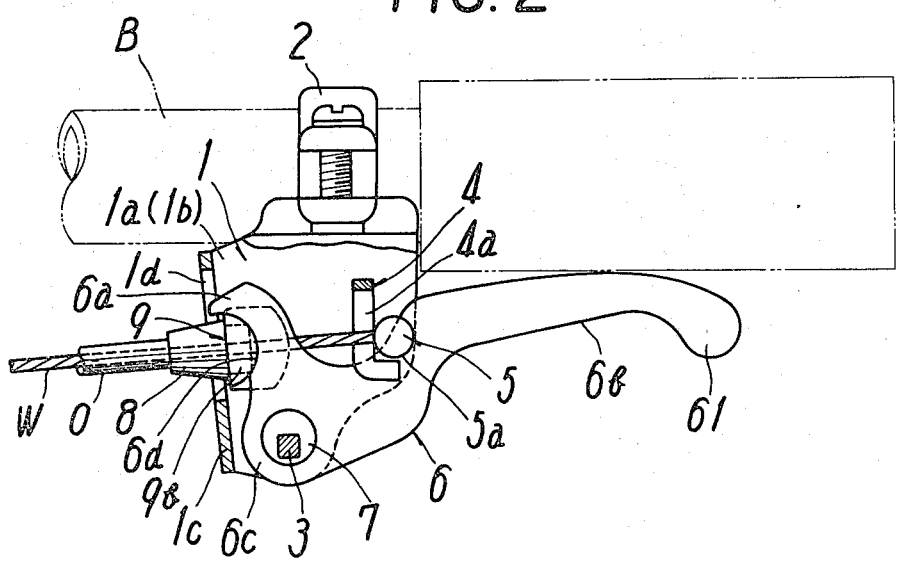
Figure 3:
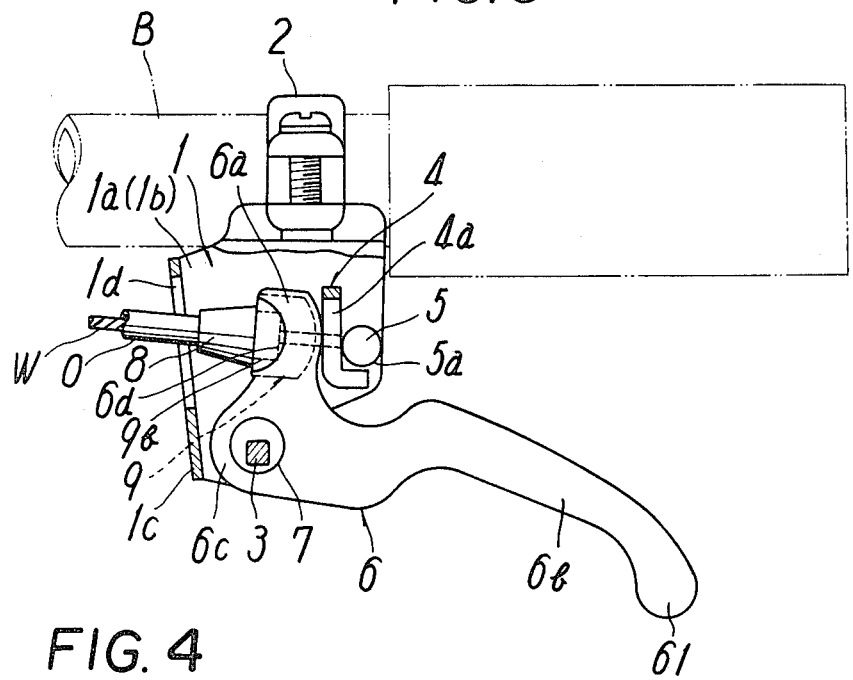
Figure 4:
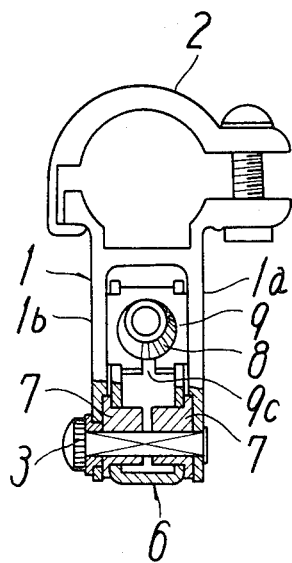

Referring to the drawings, reference numeral 1 designates a bracket member fixed to a handle bar at a bicycle through a band member 2. The bracket member 1 comprises opposite side walls 1a and 1b and a front wall 1c connecting them, the side walls 1a and 1b being provided with a lever shaft 3 and a support 4 for a control wire W, the front wall 1c being provided with an insertion bore 1d for an outer sheath O guiding the wire W.

The support 4 is integral with the bracket member 1 and has a guide groove 4a for the wire W.

The control wire W has at its one end a retainer 5 which has the surface of circular arc 5a, so that the retainer 5 is retained to the support 4 rotatably through the surface 5a.

A lever 6 is pivoted to the bracket member 1 through the lever shaft 3. The lever 6 is substantially L-like shaped and has two first and second free ends 6a and 6b, the first free end 6a being provided with sustainer recesses 6d for receiving therein an outer sheath stop 9 having a support tube 8 for the outer sheath O, the second free end 6b consituting a grip portion (for the convenience of explanation, the grip portion hereinafter is represented by reference numeral 6b). A bent portion 6c between the first and second free ends is provided with a shaft hole to form a pivot portion of the lever 6.

The lever 6 is so disposed that the first free end 6a faces the handle bar B, the grip portion 6b extends substantially lengthwise of the handle bar B, and the bent portion 6c is positioned radially outwardly of the handle bar B with respect to the position where the wire W and outer sheath O are supported and is pivotally supported to the lever shaft 3 through bushes 7. The grip portion 6b is positioned more radially outwardly of the handle bar B than the pivot portion at the bent portion 6c so that the pivot portion is placed on a straight line X—X passing throught about the center of a distance between the brake applying position (shown in the phantom line in FIG. 1) and the brake not-applying position (shown by the solid line in FIG. 1) of the grip portion 6b of lever 6, in other words, on a straight line passing through about the center of a turning angle made by movement of the utmost end 61 of grip portion 6b. Hence, the utmost end 61 of the grip portion, when the grip portion 6b is turned during exertion of the braking action, is restricted in its displacement lengthwise of the handle bar B and is displaced to a much lesser extent with respect to the brake not-applying position of grip portion 6b.

Figure 5:
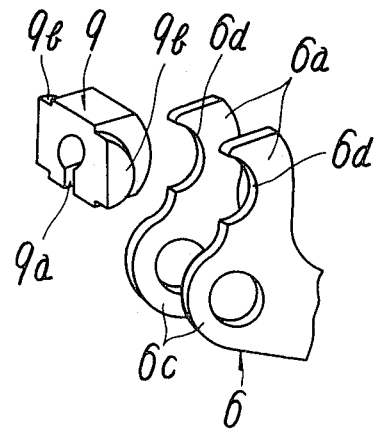
Figure 6:
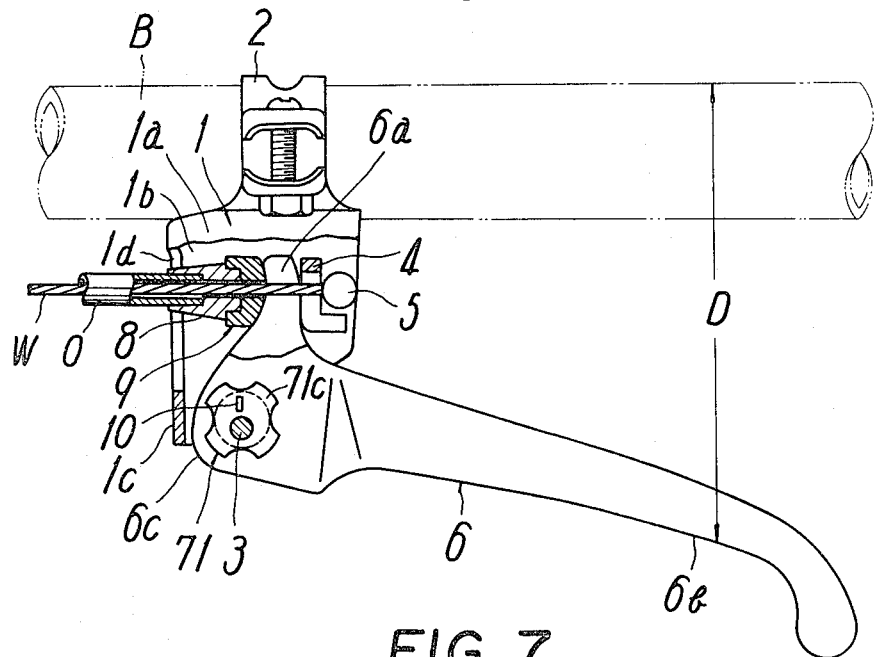
Figure 7:
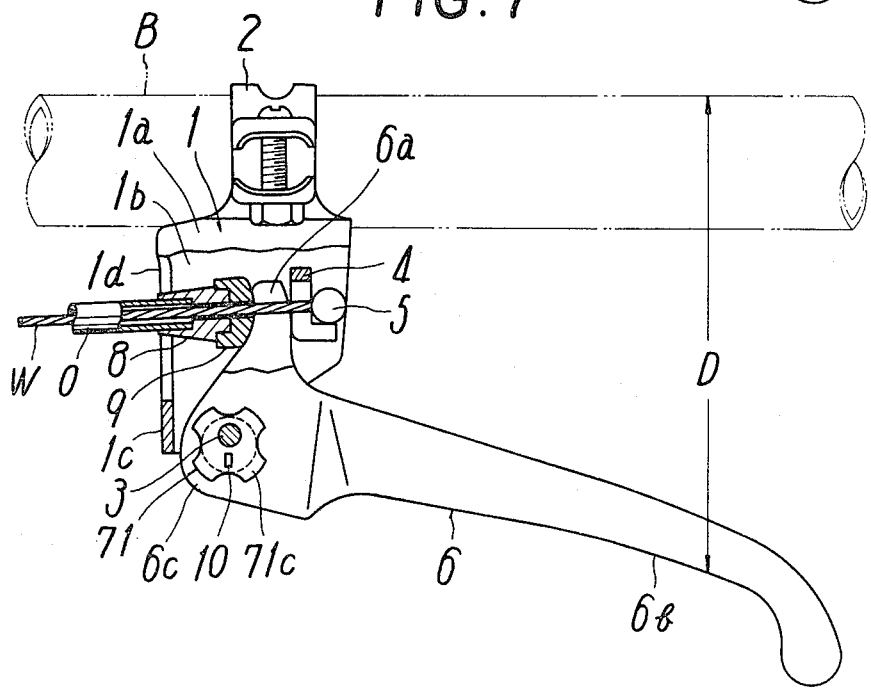
Figure 8:
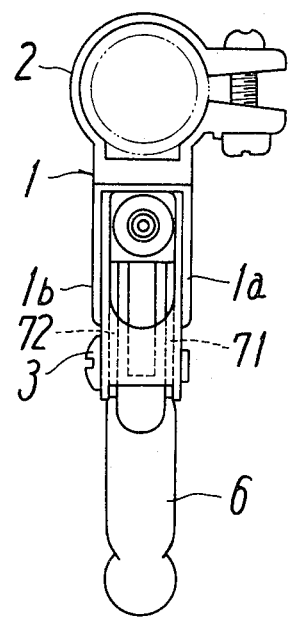
Figure 9:
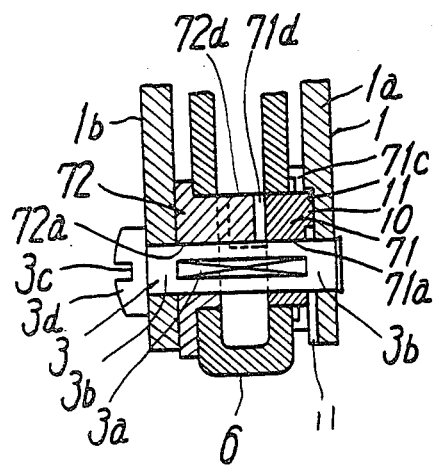
Figure 10:
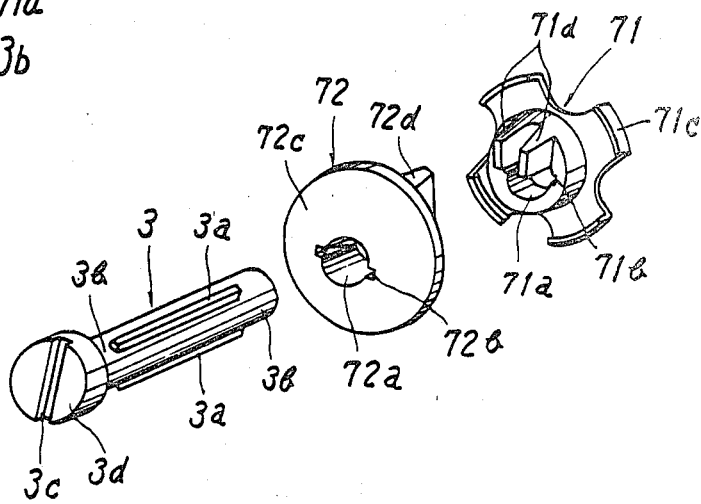

The outer sheath stop 9 having the support tube 8 is molded in synthetic resin, and is, as shown of FIG. 5, provided at its central portion with a wire guide groove 9a and at both sides thereof with lugs 9b engageable with the sustainer recesses 6d respectively. The lugs 9b and sustainer recesses 6d have engageable faces of circular arc respectively so that the outer sheath stop 9 is rotatably sustained by the recesses 6d. Alternatively, the outer sheath stop 9 may be formed of a metallic material, such as light alloy, but the same made from synthetic resin has a reduced skid resistance between the outer sheath stop 9 and the sustainer recesses 6d. Although the support tube 8 is shown as separate from the outer sheath stop 9, it may be integral therewith.

The brake operating device of the invention constructed as foregoing is operated to exert the braking action in such a manner that a rider, who tries to exert the braking action from the condition shown in FIG. 1, stretches the fingers of his hand gripping the handle bar B and grips the grip portion 6b to turn the lever 6 counterclockwise, whereby the outer sheath O together with the support tube 8 and outer sheath stop 9 is pushed in the direction of the arrow Y in FIG. 1. As a result, the outer sheath O moves relative to the control wire W to actuate movable members at the brakes to thereby effect the braking action.

When the lever 6 is operated to exert the braking action, the utmost end 61 of grip portion 6b is displaced lengthwise of the handle bar B to a lesser extent with respect to the brake not-applying position of grip portion 6b due to the fact that the lever 6 is pivoted at the position between the support position of control wire W and outer sheath O and the grip portion 6b, the pivot position being on the straight line X—X passing through about the center of turning angle θ made by the swinging grip portion 6b. Hence, the grip portion 6b gripped by the rider shifts to a much lesser extent with respect to the position where the rider's hand is gripping the handle bar B, thereby enabling performance of a stable braking action.

When the lever 6 is turned for exerting the braking action, the outer sheath stop 9 received in the sustainer recesses 6d moves in circular arc around the pivot point of lever 6 in the direction Y, at which time, relative rotation is created between the lugs 9b and the sustainer recesses 6d due to the fact that both the lugs 9b and recesses 6d engage with each other at their arched surfaces. Hence, the recesses 6d moves along the surfaces of circular arc of lugs 9b so that the control wire is not bent at its portion near the outer sheath stop 9, but is kept straight.

Therefore, the control wire W, even when the braking action is repeated, does not break. Also, the control wire W, which has at its end the retainer 5 of surface 5a of circular arc, moves along the surface of retainer 5 relative to the support 4 when the lever 6 is turned to move the outer sheath O in the direction Y. As a result, the control wire W will not break at a portion in proximity to the retaining portion, thereby further extending its lifetime.

In an alternative arrangement, the bushes, as shown in FIGS. 6 through 11, may have eccentric holes and may be made changeable in position, whereby a grip dimension D between the grip portion 6b of lever 6 and the handle bar B is easily changeable.

In detail, referring to FIGS. 9, 10, 13 and 14, first and second bushes 71 and 72 are provided and the lever shaft 3 is provided with two ridges 3a extending axially of the lever shaft 3 at the outer periphery thereof except for both axial end portions 3b. The bushes 71 and 72 are supported not-rotatably on the outer peripheral portion including the ridges 3a. At the outer peripheries of both the axially end portions 3b of the shaft where there are no ridges 3a the shaft is rotatably supported to the opposite side walls 1a and 1b of bracket member 1. At one axial end of lever shaft 3 is provided a head 3d having a rotary control profile 3c, the head 3d projecting outwardly from the side wall 1b so that the lever shaft 3 is controllable from the exterior of the bracket member 1.

The bush 71 and 72, as shown in FIGS. 9, 10, 13 and 14, are provided with eccentric shaft holes 71a and 72a respectively. At the inner peripheries of eccentric holes 71a and 72a are provided grooves 71b and 72b to mate with the ridges 3a, so that the bushes 71 and 72 are fit at the eccentric holes 71a and 72a onto the lever shaft 3 not-rotatably through the engagement of grooves 71b and 72b with ridges 3a respectively, whereby the centers of bushes 71 and 72 are shifted from the axis of lever shaft 3 at a given length. The control lever 6 is supported rotatably onto the outer pheripheries of bushes 71 and 72, so that the lever shaft 3 is rotated with respect to the bracket member 1, thereby allowing the rotation axis of control lever 6 to depart from the axis of lever shaft 3.

Figure 11:
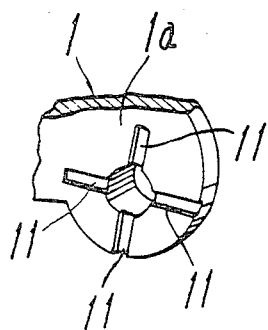
Figure 13:
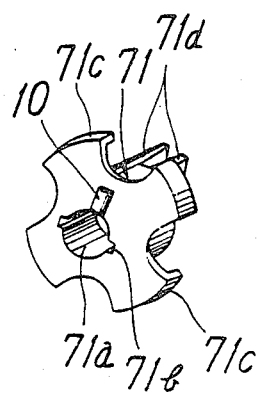
Figure 14:
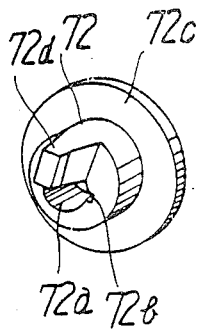
Figure 12:
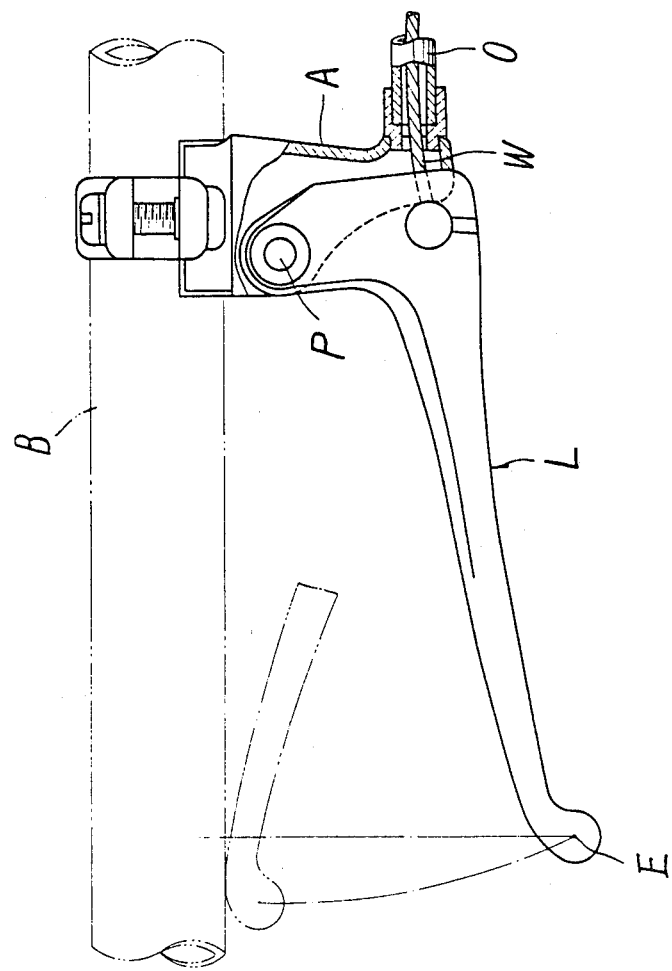

Referring to FIGS. 11 and 13, at one of one lateral surface of bush 71 and the inner surface of side wall 1a is provided one simicircular projection 10 and at the other are provided a plurality of recesses 11 insertably engageable with the projection 10, so that the projection 10 engages with one of the recesses 11 to restrain the lever shaft 3 from rotating with respect to the bracket member 1. A plurality of elastically deformable legs 71c are provided at the outer peripheral portion at one axial side of bush 71. The legs 71c are spaced circumferentially at regular intervals and extend upright toward the opposite bush 72 to contact with one side of the control lever 6. When the bush 71 together with the lever shaft 3 rotates to disengage the projection 10 from the one recess 11, the legs 71c elastically deform to allow the bush 71 to elastically deform and move away from the side wall 1a at bracket member 1. Alternatively, the projection 10 or recess 11 at the bush 71 may be attached to the legs 71c, in which case, when the projection 10 disengages from the recess 11, it is sufficient to elastically deform the legs 71c only to move away from the bracket member 1.

The bush 72 has at its one axial side a flange 72c. The flange 72c together with the legs 71c eliminates axial looseness of control lever 6. A first pawl 72d is provided at one of axially opposite surfaces of bushes 71 and 72, and two second opposite pawls 71d are provided at the other, the two pawls 71d engaging therebetween with the pawl 72d so that the bushes 71 and 72 may rotate in an integral manner.

In the above construction, the projection 10 at the bush 71 normally engages with the one recess 11 at the side wall 1a of bracket member 1 to thereby hold the bush 71 against rotation with respect to the bracket member 1 and also the lever shaft 3 which is securely attached to the bush 71 is restrained from rotating with respect to the same.

The grip dimension, a gap between the grip portion 6b and the handle bar B, is changed by a turn of lever shaft 3 at a given angle with respect to the bracket member 1. In detail, the lever shaft 3 is rotated by a suitable tool engaging with the rotary control profile 3c to disengage the projection 10 from the recess 11, so that the bushes 71 and 72 having eccentric shaft holes rotate to shift the rotation axis of control lever 6 with respect to the axis of lever shaft 3, and the control lever 6 is adjusted to change the grip dimension, that is, the grip portion 6b of lever 6 moves from the position shown in FIG. 6 to that shown in FIG. 7, at which time the projection 10 has been displaced to engage with another recess 11 to hold the bush 71 securely to the bracket member 1. Hence, the lever shaft 3 is free from careless rotation and the changed grip dimension is maintained.

The foregoing disclosure is for the purpose of disclosing specific preffered embodiment and the scope of this invention is of course not limited to this specific construction, but only as defined in the following claims.

What is claimed is:

1. A brake operating device for operating bicycle brakes through a control wire comprising a bracket member fixed to a handle bar of said bicycle, a lever shaft supported to said bracket member, and a control lever pivoted to said bracket member through said lever shaft, said control lever having a pivot portion surrounding said lever shaft and a grip portion, said grip portion being displaceably between a brake applying position in closest proximity with respect to said handle bar and a rest position farthest away from said handle bar, said lever shaft being positioned on a straight line passing through a substantially central portion between the brake applying position and the rest position of the distal end of said grip portion, said lever shaft including bushes having eccentric shaft holes respectively so that said lever is supported swingably to said lever shaft through said bushes, said brake operating device further comprising means for circumferentially rotating said bushes with respect to said bracket member to alter the position of said lever shaft and a grip dimension existing between said lever and said handle bar, and means for moving said control wire to operate said brakes in accordance with swinging motion of said lever about said lever shaft.

2. A brake operating device according to claim 1, wherein one of said one bush and bracket member opposite thereto is provided with a projection and the other is provided with a plurality of engaging portions engageably receiving therein said projection to secure said one bush to said bracket member.

3. A brake operating device according to claim 1, wherein said control lever is substantially L-like shaped and has a first and second free end portions and a bent portion formed in said pivot portion, said first free end portion being directed towards said handle bar and having a sustaining portion for sustaining an outer sheath stop of an outer sheath guiding said control wire, said bracket member having a support for said control wire, said second free end portion extending along said handle bar so as to form said grip portion, the distal end of said grip portion being positioned radially outwardly of said handle bar with respect to said pivot portion.

4. A brake operating device according to claim 3, wherein said sustaining portion at said first free end portion and said outer sheath stop received by said sustaining portion have opposite faces of circular arc respectively, said outer sheath stop being sustained rotatably by said sustaining portion.

5. A brake operating device according to claim 3, wherein said control wire has a retainer which is engageably retained to said support, said retainer having a surface of circular arc and being retained to said support through said surface of circular arc.

* * * * *